United States Patent [19]

Doi et al.

[11] Patent Number: 4,928,122
[45] Date of Patent: May 22, 1990

[54] EXPOSURE HEAD

[75] Inventors: Atsuhiro Doi; Tomonori Nishio, both of Kanagawa, Japan

[73] Assignee: Fuji Photo Film Co., Ltd., Kanagawa, Japan

[21] Appl. No.: 299,578

[22] Filed: Jan. 23, 1989

[30] Foreign Application Priority Data

Jan. 21, 1988 [JP]  Japan .................................. 63-12361
Apr. 19, 1988 [JP]  Japan .................................. 63-96138
Apr. 19, 1988 [JP]  Japan .................................. 63-96139
Apr. 19, 1988 [JP]  Japan .................................. 63-96140

[51] Int. Cl.$^5$ ............................................ G01D 15/00
[52] U.S. Cl. .................................... 346/160; 346/155
[58] Field of Search ................ 346/160, 107 R, 108, 346/150, 155; 355/228, 229; 358/300, 302

[56] References Cited

U.S. PATENT DOCUMENTS 4,703,334 10/1987 Mochimoru et al. ................ 346/155
4,827,290 5/1989 Yoritomo et al. ................... 346/160

Primary Examiner—Arthur G. Evans
Attorney, Agent, or Firm—Sughrue, Mion, Zinn, Macpeak & Seas

[57] ABSTRACT

An exposure head for use in an image recording apparatus records a two-dimensional image on a photosensitive medium by scanning the photosensitive medium with light beams modulated by image information in a main scanning direction while the photosensitive medium is being moved in an auxiliary direction transverse to the main scanning direction. The exposure head has a light source for emitting the light beams, and an aperture member disposed between the light source and the photosensitive medium and having a plurality of apertures defined therein for passing the light beams respectively therethrough, each of the apertures being shorter in the main scanning direction and longer in the auxiliary scanning direction. Each of the apertures has a width smaller than that of a corresponding one of light-emitting areas of the light source. The light source comprises a plurality of light-emitting devices for emitting the light beams, respectively, and a light-shielding member is disposed between adjacent two of the light sources. Each of the apertures is progressively tapered from one of the light sources toward the photosensitive medium. Alternatively, a plurality of optical filters may be positioned respectively over open ends of the apertures closer to the photosensitive medium for selectively passing the light beams of respective wavelengths emitted from the light sources aligned respectively with the apertures.

10 Claims, 10 Drawing Sheets

EXPOSURE HEAD

BACKGROUND OF THE INVENTION

The present invention relates to an exposure head, and more particularly to an exposure head for use in a scanning recording apparatus in which a recording medium is scanned by light beams emitted from a light source and modulated by image information to record a high-quality image free of irregularities on the recording medium.

There is known a scanning recording apparatus in which a recording medium is wound around a recording drum and rotated at a high speed in a main scanning direction whereas an exposure head is moved in an auxiliary scanning direction to record characters, an image, or the like on the recording medium.

The exposure head in the scanning recording apparatus comprises a light-emitting device such as an LED is disposed on a stem. A light beam emitted from the light-emitting device is focused on the recording medium by a lens.

In order to produce a colored image, it is necessary to employ a light beam for emitting light beams to form three primaries (e.g., yellow, magenta, and cyan) on the recording medium. There is an exposure head having light-emitting devices capable of emitting light beams for producing three primaries, the light-emitting devices being arrayed on a single stem. The light beams emitted from the respective light-emitting devices pass through apertures by which flaring light is removed, and are then focused on a recording medium by a lens. The exposure head of this type is advantageous in that it is constructed of fewer parts and more compact than would be if respective light-emitting devices were used as independent exposure heads.

In the above scanning recording apparatus, the recording drum is rotated and at the same time the exposure head is moved to record an image or the like two-dimensionally on the recording medium. Therefore, each of pixels which are formed on the recording medium by the light beams is elongated in the direction of rotation of the recording drum and also in the direction in which the exposure head is moved. Since the speed of rotation of the recording drum in the main scanning direction is higher than the speed of movement of the exposure head in the auxiliary scanning direction, the pixels are elongated in the main scanning direction. The intensity of each of the light beams emitted from the light-emitting devices such as LEDs is of a substantially Gaussian distribution. Therefore, if the output power of each light beam is low and the density of each pixel on the recording medium is low, then the pixel is long in the main scanning direction and narrow in the auxiliary scanning direction. If the light beam output power is high and the pixel density is high, then the pixel is wide in the auxiliary scanning direction. As a result, an image which is produced by the scanning recording apparatus is elongate in the main scanning direction and irregular in the auxiliary scanning direction, resulting in a low image quality.

Where the light-emitting devices are not attached in accurate positions, images focused on the recording medium by the focusing ens are displaced with respect to each other, and a resultant colored image undergoes a color shift and hence has a poor quality. It is not easy to attach the light-emitting devices with high accuracy, and highly accurate attachment of the light-emitting devices is costly.

The light-emitting devices arranged on the stem are protected by a transparent film such as of an acrylic resin. Consequently, a portion of the light beams emitted from the light-emitting devices is reflected by the transparent film and then applied as flaring light to the focusing lens. The produced image may be blurred by the flaring light and lowered in quality. It is possible to cut off a portion of the flaring light with an aperture member disposed between the light-emitting devices and the focusing lens. However, when a portion of the light beam emitted from one light-emitting devices is applied by diffusion or the like to the aperture associated with another light-emitting device, the image is also blurred by flaring light caused by such a light beam.

SUMMARY OF THE INVENTION

It is a principal object of the present invention to provide an exposure head capable of producing a high-quality image free of irregularities by guiding light beams emitted from light sources and modulated by image information through apertures of predetermined shape to a recording medium.

Another object of the present invention is to provide an exposure head for scanning a photosensitive medium with light beams modulated by image information in a main scanning direction while the photosensitive medium and the light beams are being relatively moved in an auxiliary direction transverse to the main scanning direction, to record a two-dimensional image on the photosensitive medium, comprising: a light source for emitting the light beams; and an aperture member disposed between said light source and the photosensitive medium and having a plurality of apertures defined therein for passing the light beams respectively therethrough, each of said apertures being shorter in said main scanning direction and longer in said auxiliary scanning direction.

Still another object of the present invention is to provide the exposure head wherein said light source comprises a plurality of light-emitting devices, said apertures being positioned in alignment with said light-emitting devices, respectively.

Yet another object of the present invention is to provide an exposure head for scanning a photosensitive medium with light beams modulated by image information to record an image on the photosensitive medium, comprising: a light source for emitting the light beams; and an aperture member disposed between said light source and the photosensitive medium and having a plurality of apertures defined therein for passing the light beams respectively therethrough, each of said apertures having a width smaller than that of a corresponding one of light-emitting areas of said light source.

Yet still another object of the present invention is to provide the exposure head wherein said light source comprises a plurality of light-emitting devices, said apertures being positioned in alignment with said light-emitting devices, respectively.

A further object of the present invention is to provide an exposure head for scanning a photosensitive medium with light beams modulated by image information to record an image on the photosensitive medium, comprising: a plurality of light sources for emitting the light beams, respectively; and a light-shielding member disposed between adjacent two of said light sources.

A still further object of the present invention is to provide the exposure head wherein said light-shielding member comprises a light-shielding plate.

A yet further object of the present invention is to provide the exposure head wherein said light-shielding member comprises a light-emitting device which is incapable of emitting light.

A yet still further object of the present invention is to provide an exposure head for scanning a photosensitive medium with light beams modulated by image information to record an image on the photosensitive medium, comprising: a plurality of light sources for emitting the light beams, respectively; and an aperture member disposed between said light sources and the photosensitive medium and having a plurality of apertures defined therein in alignment with said light sources, respectively, for passing the light beams respectively therethrough, each of said apertures being progressively tapered from one of the light sources toward said photosensitive medium.

Still another object of the present invention is to provide the exposure head wherein each of said apertures is defined by a wall surface inclined at an angle $\theta$ to the optical axis of the light beam passing therethrough, said angle $\theta$ being selected to meet the following relationship:

$$2\theta + \alpha > \pi/2$$

where $\alpha$ is the minimum angle at which the light beam emitted from an adjacent one of the light sources falls in said each aperture.

It is also an object of the present invention is to provide an exposure head for scanning a photosensitive medium with light beams modulated by image information to record an image on the photosensitive medium, comprising: a plurality of light sources for emitting the light beams, respectively; an aperture member disposed between said light sources and the photosensitive medium and having a plurality of apertures defined therein in alignment with said light sources, respectively, for passing the light beams respectively therethrough; and a plurality of optical filters positioned respectively over said apertures for selectively passing the light beams of respective wavelengths emitted from said light sources aligned respectively with said apertures.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

Figure 1:
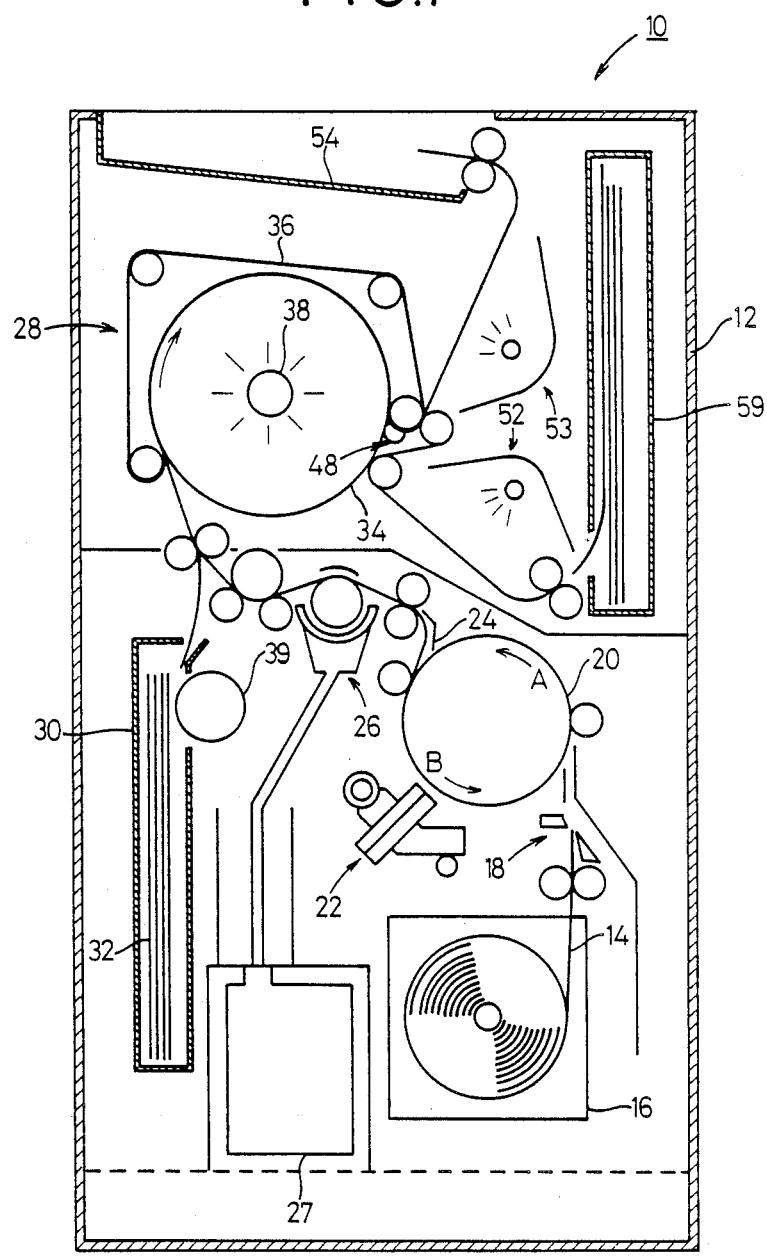
FIG. 1 is a schematic vertical cross-sectional view of an image recording apparatus incorporating therein an exposure head according to an embodiment of the present invention.

FIG. 1 shows an image recording apparatus 10 incorporating therein an exposure head according to an embodiment of the present invention.

The image recording apparatus 10 has a casing 12 housing therein a magazine 16 storing a photosensitive medium 14 as a roll of image forming sheet. The photosensitive medium 14 pulled out of the magazine 16 is cut off to a length which is wound around a photosensitive drum 20. An exposure head 22 according to an embodiment of the present invention is disposed near the outer periphery of the photo sensitive drum 20. The photosensitive drum 20 is rotated about its own axis at a high speed in a main scanning direction indicated by the arrow A. The exposure head 22 is movable in an auxiliary scanning direction normal to the sheet of FIG. 1 for forming an image on the photosensitive medium 14 on the photosensitive drum 20.

A scraper 24 is slidably held against the outer periphery of the photosensitive drum 20. When the photosensitive drum 20 is rotated in the direction of the arrow B, the photosensitive medium 14 wound around the photosensitive drum 20 is peeled off by the scraper 24 and delivered to a water applicator 26. The water applicator 26 serves to coat the photosensitive medium 14 with water supplied as an image forming solvent from a tank 27. The photosensitive medium 14 which has been coated with water is then fed to a thermal image development and transfer unit 28 which heats the photosensitive medium 14

A plurality of image receptive mediums 32 of a predetermined shape are stored in a tray 30 disposed below the thermal development and transfer unit 28. One of the image receptive mediums 32, at a time, is supplied from the tray 30 by a supply roller 39, and then superposed on the photosensitive medium 26 from the water applicator 26, after which the photosensitive medium 26 and the image receptive medium 32 as they are superposed one on the other are fed to the thermal development and transfer unit 28.

The thermal development and transfer unit 28 comprises a heating drum 34 and an endless pressing belt 36. A halogen lamp 38 is disposed in the heating drum 34 for heating the photosensitive medium 14 and the image receptive medium 32, which are sandwiched between the heating drum 34 and the endless pressing belt 36 and delivered over an about 2/3 of the outer peripheral surface of the heating drum 34. The photosensitive medium 14 is heated to about 90° C. through the heating drum 34 by the halogen lamp 38 for thermally developing an image thereon.

A peeling means 48 is disposed laterally of the thermal development and transfer unit 28 for separating the photosensitive medium 14 and the image receptive medium 32 from each other when they are fed out of the thermal development and transfer unit 28. The photosensitive medium 14 separated by the peeling means 48 is delivered into a waste tray 59 and the image receptive medium 32 separated by the peeling means 48 is delivered onto a pickup tray 54 disposed in an upper portion of the casing 12. Drying means 52, 53 comprising illuminating light sources or the like are disposed respectively in the passage of the photosensitive medium 14 between the thermal development and transfer unit 28 and the waste tray 59 and the passage of the image receptive medium 32 between the thermal development and transfer unit 28 and the pickup tray 54.

Figure 2:
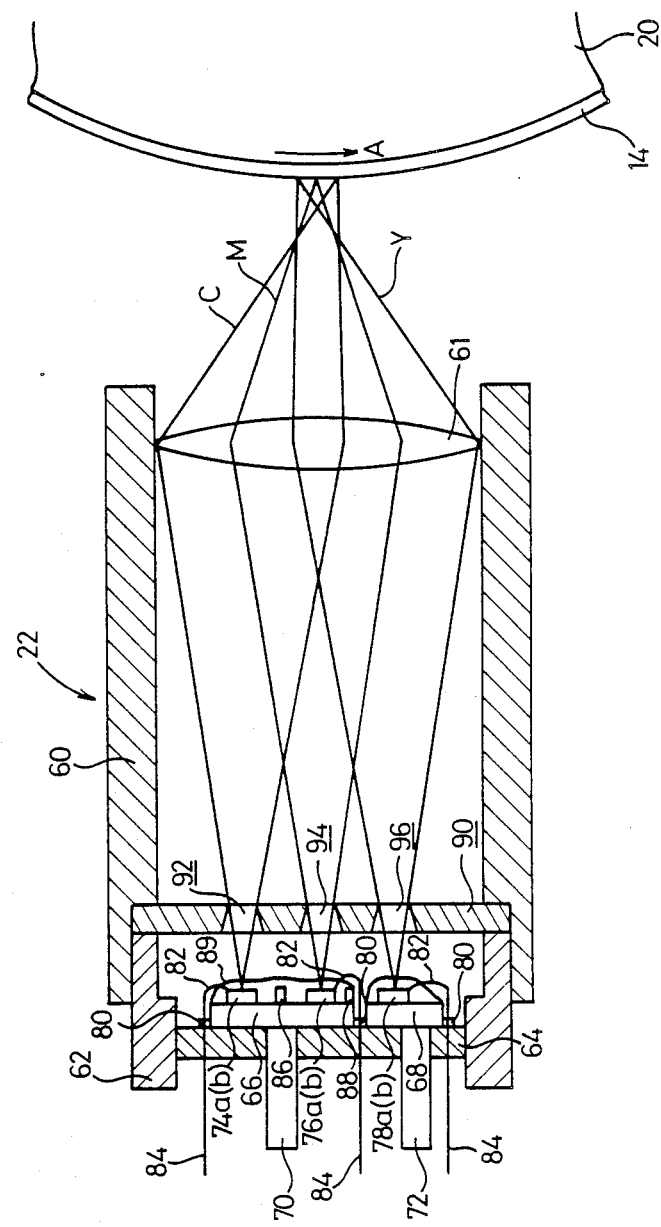
FIG. 2 is a cross-sectional view of the exposure head.
Figure 3:
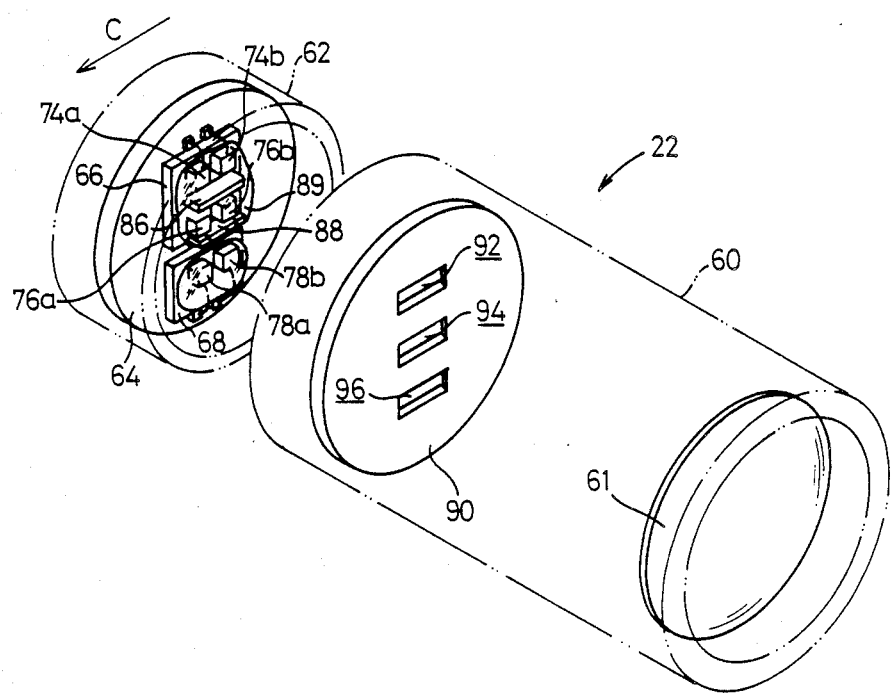
FIG. 3 is a perspective view of the exposure head shown in FIG. 2.

The exposure head 22 in the image recording apparatus 10 is constructed as shown in FIGS. 2 and 3. The exposure head 22 comprises a first tubular body 60 supporting a focusing lens 61 in an opening thereof near the photosensitive drum 20 and having an antireflection surface on its inner periphery, and a second tubular body 62 having an antireflection surface on its inner periphery and partly mounted in the first tubular body 60, with an attachment plate 64 being mounted in the second tubular body 62. The attachment plate 64 is made of an insulating material. Two electrically conductive substrates 66, 68 are attached to the surface of the attachment plate 64 which faces toward the photosensitive drum 20. To the substrates 66, 28, there are connected heat radiation bases 70, 72, respectively, extending through the attachment plate 64 out of the second tubular body 62, the heat radiation bases 70, 72 serving as electrodes.

As shown in FIG. 3, LEDs 74a, 74b and 76a, 76b of an NP junction are mounted on the substrate 66 and spaced in the auxiliary scanning direction (indicated by the arrow C), and LEDs 78a, 78b of a PN junction are also mounted on the substrate 68 and spaced in the auxiliary scanning direction. The LEDs 74a, 74b, 76a, 76b, and 78a, 78b emit light beams of different wavelengths toward the photosensitive medium 14 wound around the photosensitive drum 20. For example, the LEDs 74a, 74b apply infrared radiation to develop a dye of cyan (C) to the photosensitive medium 14, the LEDs 76a, 76b apply red light develop a dye of magenta (M) to the photosensitive medium 14, and the LEDs 78a, 78b apply yellow light to develop a dye of yellow (Y). The LEDs 74a, 74b, 76a, 76b, and 78a, 78b are connected to electrodes 88 on the attachment plate 64 through wires 82, and the electrodes 88 are connected to wires 84 extending through the attachment plate 64. Electric currents can thus be supplied via the wires 84, 82 to LEDs 74a, 74b, 76a, 76b, and 78a, 78b.

Light-shielding plates 86, 88 are disposed between the LEDs 74a, 74b, 76a, 76b, and 78a, 78b which are also spaced in the main scanning direction (indicated by the arrow A) normal to the auxiliary scanning direction (indicated by the arrow C). The light-shielding plates 86, 88 are securely mounted on the substrate 66, and are in the form of ceramic members each having an antireflection outer surface. The LEDs 74a, 74b, 76a, 76b, and 78a, 78b and the light-shielding plates 86, 88 are covered with a transparent acrylic resin layer 89 for protection against damage, deformation, or the like.

Figure 4:
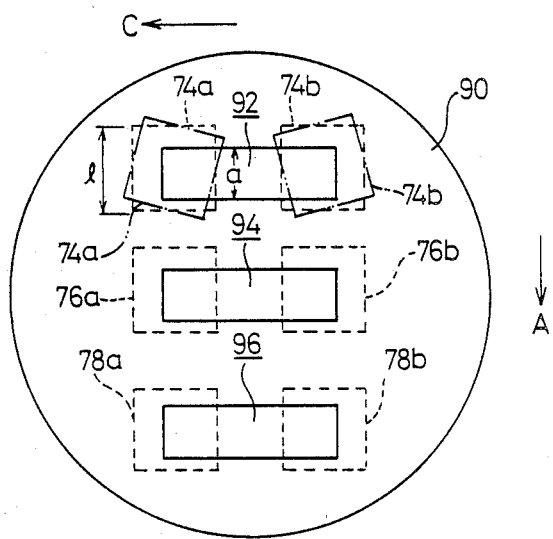
FIG. 4, is a front elevational view of an aperture member in the exposure head of FIG. 2.

An aperture member 90 having antireflection outer surfaces is disposed between the first and second tubular bodies 60, 62. The aperture member 90 has apertures 92, 94, 96 defined therein in alignment with the LEDs 74a, 74b, 76a, 76b, and 78a, 78b, respectively. As illustrated in FIG. 4, each of the apertures 92, 94, 96 is shorter in the main scanning direction (indicated by the arrow A) and longer in the auxiliary scanning direction (indicated by the arrow C). The width a of each of the apertures 92, 94, 96 in the main scanning direction is smaller than the width L of each of the LEDs 74a, 74b, 76a, 76b, and 78a, 78b. As shown in FIG. 2, each of the apertures 92, 94, 96 is tapered from the LEDs 74a, 74b, 76a, 76b, and 78a, 78b toward the focusing lens 61.

The image recording apparatus incorporating the above exposure head is basically constructed as described above. Operation and advantages of the image recording apparatus will be described below.

The photosensitive medium 14 stored in the magazine 16 is cut off to a prescribed length by the cutter 18, and the cut length of the photosensitive medium 14 with its trailing end cut off by the cutter 18 is wound around the photosensitive drum 20. Then, the photosensitive medium 14 on the photosensitive drum 20 is exposed to light from the exposure head 22 to record an image on the photosensitive medium 14.

More specifically, as shown in FIG. 2, when electric currents modulated by desired image information are passed between the heat radiation bases 70, 72 and the wires 84, light beams of respective wavelengths are emitted from the LEDs 74a, 74b, 76a, 76b, and 78a, 78b. The infrared radiation emitted from the LEDs 74a, 74b passes through the acrylic resin layer 89 and the aperture 92 in the aperture member 90, and is then focused by the focusing lens 61 onto the photosensitive medium 14 to simultaneously form two pixels of cyan which correspond respectively to the LEDs 74a, 74b. Likewise, the red light emitted from the LEDs 76a, 76b passes through the aperture 94 in the aperture member 90, and is then focused by the focusing lens 61 onto the photosensitive medium 14 to simultaneously form two pixels of magenta which correspond respectively to the LEDs 76a, 76b. Likewise, the yellow light emitted from the LEDs 78a, 78b passes through the aperture 96 in the aperture member 90, and is then focused by the focusing lens 61 onto the photosensitive medium 14 to simultaneously form two pixels of yellow which correspond respectively to the LEDs 78a, 78b.

The pixels formed respectively by the LEDs 74a, 74b, 76a, 76b, and 78a, 78b are offset or displaced certain intervals in the main scanning direction of the arrow A. By rotating the photosensitive drum 20 at a high speed in the main scanning direction, the colors of cyan, magenta, and yellow are superimposed to form a desired color. The exposure head 22 is moved in the auxiliary scanning direction of the arrow C to form two pixels simultaneously in this direction. As a consequence, a colored image is two-dimensionally recorded on the photosensitive medium 14.

Figure 5:
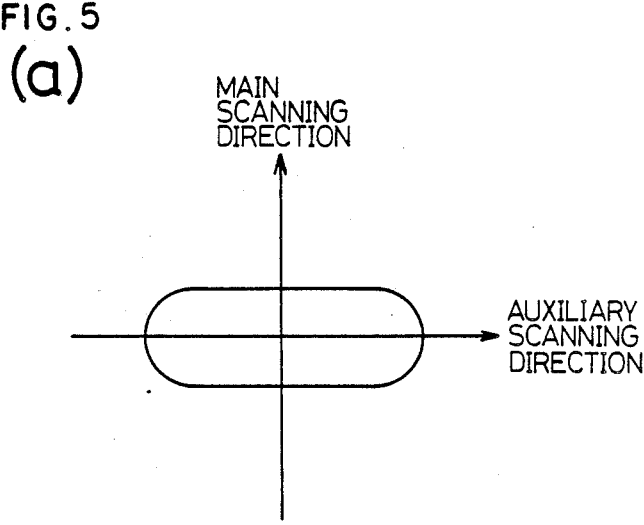
FIGS. 5a, 5b and 5c are graphs showing the characteristics of light beams emitted from the exposure head shown in FIG. 2.
Figure 5:
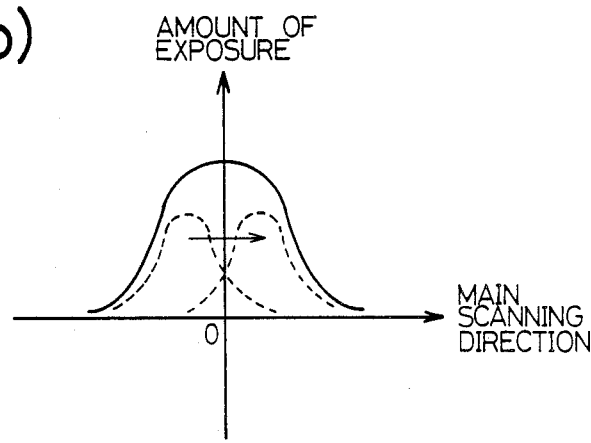
Figure 5:
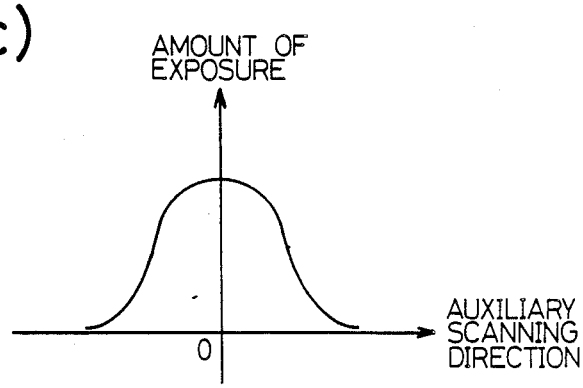

In this embodiment, the light beams emitted respectively from the LEDs 74a, 74b, 76a, 76b, and 78a, 78b are guided onto the photosensitive medium 14 through the apertures 92, 94, 96 which are defined in the aperture member 90 and shorter in the main scanning direction and longer in the auxiliary scanning direction. Since the light beams are partly shielded or cut off by the apertures 92, 94, 96 in the main scanning direction, a beam spot which is shorter in the main scanning direction and longer in the auxiliary scanning direction as shown in FIG. 5a is formed by each of the light beams. At this time, the photosensitive medium 14 is moving in the main scanning direction due to high-speed rotation of the photosensitive drum 20. Therefore, a light beam having an intensity distribution as indicated by the broken line in FIG. 5b moves on the photosensitive medium 14 in the main scanning direction, so that a pixel having an exposure distribution as indicated by the solid line in FIG. 5b is formed on the photosensitive medium 14. The exposure head 22 is moving in the auxiliary scanning direction at a speed lower than the speed of travel of the photosensitive medium 14 in the main scanning direction. Inasmuch as the apertures 92, 94, 96 are elongate in the auxiliary scanning direction, the light beams are not shielded or cut off by the apertures 92, 94, 96 in the auxiliary scanning direction. As a consequence, a pixel having a Gaussian intensity distribution as indicated in FIG. 5c, which is similar to the distribution shown in FIG. 5b, is formed on the photosensitive medium 14 in the auxiliary scanning direction. Each of the pixels formed on the photosensitive medium 14 is therefore substantially equally shaped in both the main and auxiliary scanning directions. Any image formed on the photosensitive medium 14 is thus not elongated in the main scanning direction, and any irregularities of an image in the auxiliary scanning direction are made less visible, so that high-quality images can be formed by the image recording apparatus.

The spots formed on the photosensitive medium 14 by the light beams may be of any desired shape by selecting the shape of the apertures 92, 94, 96 dependent on the main and auxiliary scanning speeds. Since the light beams are shaped by the aperture member 90 in this embodiment, it is not necessary to design the LEDs 74a, 74b, 76a, 76b, and 78a, 78b so that they can form a special beam spot shape as shown in FIG. 5a. Accordingly, the image quality can be increased inexpensively.

As shown in FIG. 4, the width a in the main scanning direction of the apertures 92, 94, 96 in the aperture member 90 is smaller than the width l of the light-emitting areas of the LEDs 74a, 74b, 76a, 76b, and 78a, 78b. With this arrangement, only the portion of the light beams emitted from the LEDs 74a, 74b which corresponds to the aperture 92 is permitted to pass through the aperture 92, but the other portion of these light beams is cut off by the aperture member 90. As a result, even if the LEDs 74a, 74b are positionally displaced out of a desired position as indicated by the dot-and-dash lines in FIG. 4, the light beams emitted from the LEDs 74a, 74b are properly focused on the photosensitive medium 61 at a desired position by the focusing lens 61. Pixels can thus be formed in accurate positions on the photosensitive medium 14 regardless of the accuracy with which the LEDs 74a, 74b are attached to the substrate 66. Pixels can also be formed in accurate positions by the light beams emitted from the other LEDs 76a, 76b, 78a, 78b without requiring strict positional accuracy for these LEDs. Thus, high-quality images free from irregularities can be produced.

Considerable difficulty will be encountered in increasing the accuracy of attachment of the LEDs 74a, 74b, 76a, 76b, and 78a, 78b to the substrates 66, 68, but it is easily possible to define the apertures 92, 94, 96 in the aperture member 90 accurately at spaced intervals by etching or the like. The exposure head 22 can thus be manufactured at a high rate of production with a reduced cost.

Figure 6:
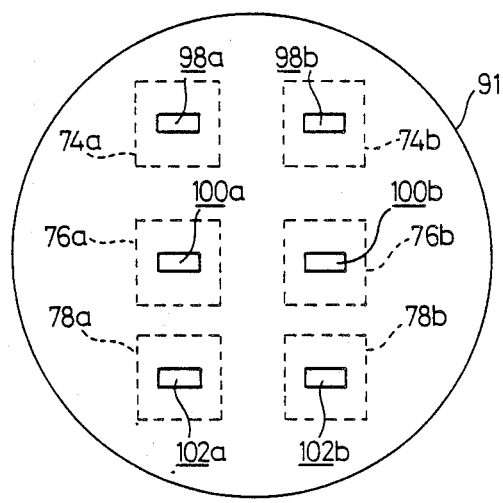
FIG. 6 is a front elevational view of an aperture member according to another embodiment of the present invention.

As shown in FIG. 6, an aperture member 91 according to another embodiment of the present invention has independent apertures 98a, 98b, 100a, 100b, and 102a, 102b corresponding respectively to the LEDs 74a, 74b, 76a, 76b, and 78a, 78b. This arrangement allows the LEDs 74a, 74b, 76a, 76b, and 78a, 78b to be positionally displaced to a certain extent also in the auxiliary scanning direction. Therefore, the rate of production of the exposure head can further be increased.

In the present embodiment, flaring light can appropriately be removed by the light-shielding plates 86, 88 disposed between the LEDs 74a, 74b, 76a, 76b, and 78a, 78b.

Figure 7:
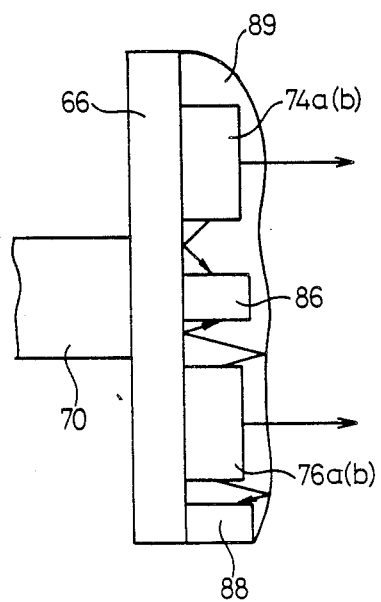
FIG. 7 is a side elevational view showing light-emitting devices in the exposure head of FIG. 2.

More specifically, the light beams emitted from the LEDs 74a, 74b, 76a, 76b, and 78a, 78b are partly reflected within the acrylic resin layer 89, and the reflected light would tend to be applied as flaring light to the photosensitive medium 14 through the apertures 92, 94, 96, thus the quality of an image produced on the photosensitive medium 14. However, the light-shielding plates 96, 88 are disposed between the LEDs 74a, 74b and 76a, 76b and between the LEDs 76a, 76b and 78a, 78b, as shown in FIG. 7. Consequently, the flaring light originated from the LEDs 74a, 74b and reflected within the acrylic resin layer 89 is shielded or cut off by the light-shielding plate 86 and will not reach the lens 61 through the aperture member 90. Likewise, the flaring light originated from the LEDs 76a, 76b and the flaring light originated from the LEDs 78a, 78a are also shielded or cut off by the light-shielding plates 86, 88. Only such portions of the light beams emitted from the LEDs 74a, 74b, 76a, 76b, and 78a, 78b which are required to record an image on the photosensitive medium 14 are passed through the apertures 92, 94, 96 and applied to the photosensitive medium 14. As a result, the photosensitive medium 14 is irradiated with light beams from which flaring light has been removed for forming a clear image thereon.

Figure 8A:
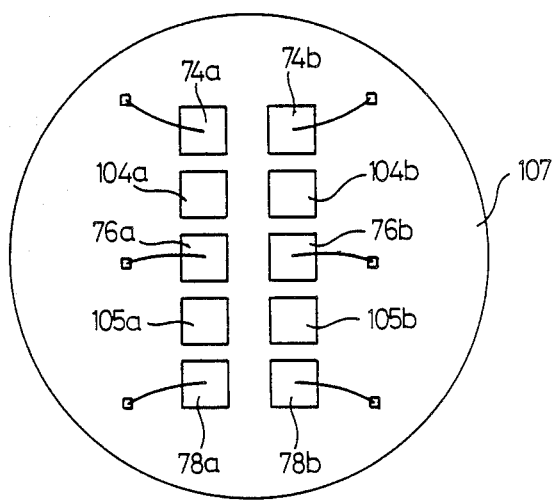
FIGS. 8a and 8b are front and side elevational views, respectively, of light-emitting devices according to still another embodiment of the present invention.
Figure 8B:
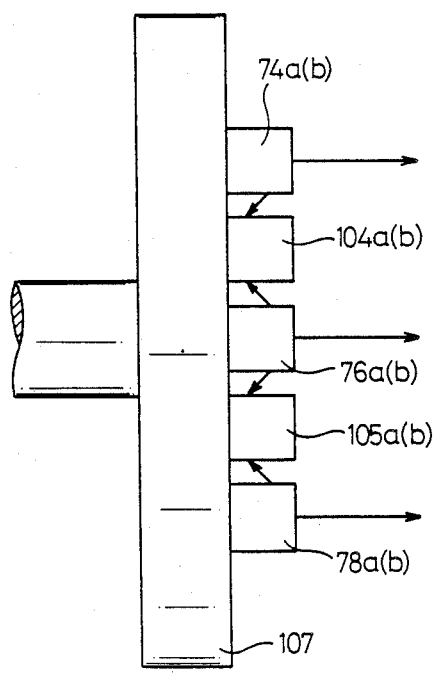

FIGS. 8a and 8b show an exposure head in accordance with still another embodiment of the present invention. In this embodiment, dummy LEDs 104a, 104b and 105a, 105b which do not emit light are displaced, in place of the light-shielding plates 86, 88 shown in FIGS. 2 and 3, between the LEDs 74a, 74b, 76a, 76b, and 78a, 78b. The LEDs 74a, 74b, 76a, 76b, and 78a, 78b and the dummy LEDs 104a, 104b, 105a, 105b are disposed on a common substrate 107. As shown in FIG. 8a, no current supplying wires are connected to the dummy LEDs 104a, 104b and 105a, 105b to prevent them from emitting light. In this embodiment, flaring light emitted from the LEDs 74a, 74b, 76a, 76b, and 78a, 78b is absorbed or cut off by the dummy LEDs 104a, 104b and 105a, 105b and does not reach the photosensitive medium 14. The dummy LEDs 104a, 104b and 105a, 105b and the LEDs 74a, 74b, 76a, 76b and 78a, 78b may simultaneously be fabricated on the substrate 107. The exposure head can be manufactured more easily because no light-shieding plates are required to be mounted on the substrates 66, 68 in a separate process as with the previous embodiment.

Figure 9:
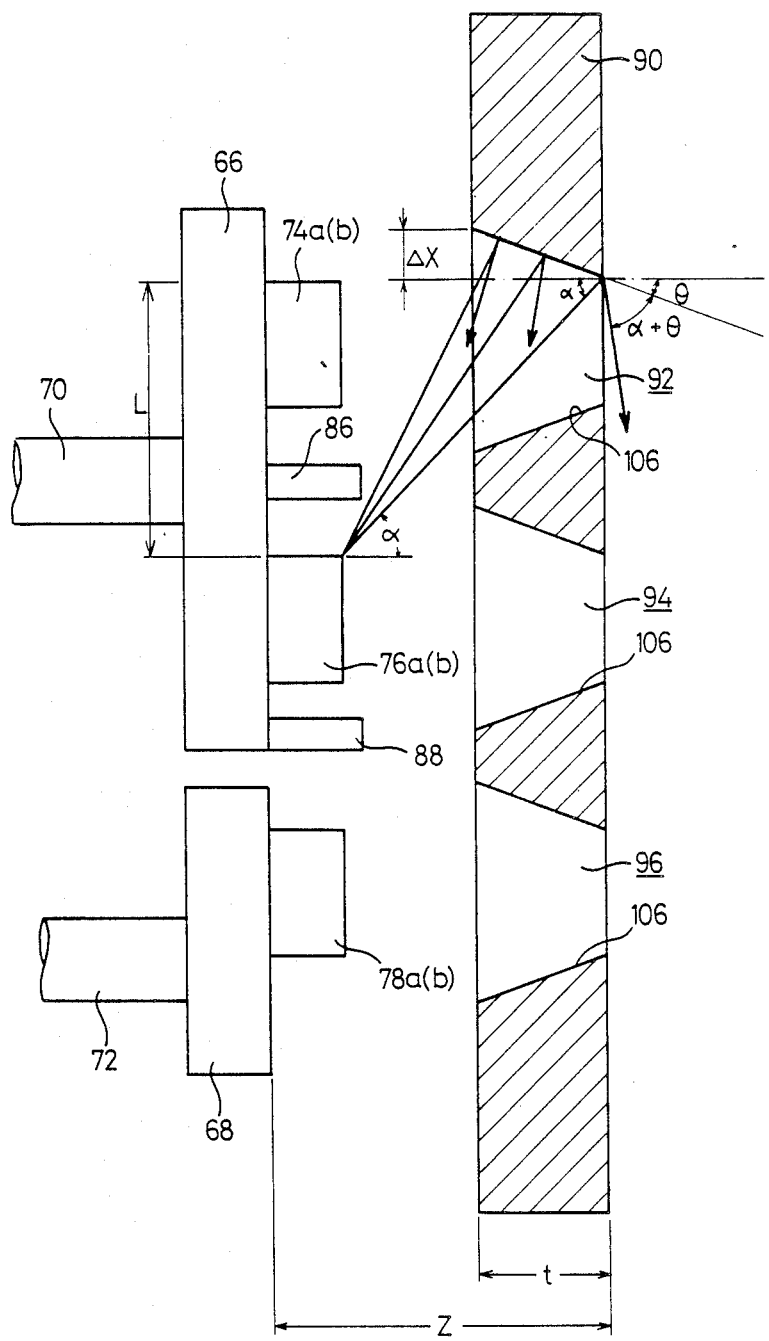
FIG. 9 is a fragmentary side elevational view, partly in cross section, of the exposure head shown in FIG. 2.

The apertures 92, 94, 96 defined in the aperture member 90 may be shaped as shown in FIG. 9 for more effectively cutting off flaring light for the formation of images of better quality.

More specifically, as shown in FIG. 9, the apertures 92, 94, 96 are progressively tapered from the LEDs 74a, 74b, 76a, 76b, and 78a, 78b toward the focusing lens 61. Assuming that the distances between the upper edges of the LEDs 74a, 74b, 76a, 76b, and 78a, 78b are indicated by L, the width of the aperture member 90 is t, the distance between the front surfaces (righthand surfaces as shown) of the LEDs 74a, 74b, 76a, 76b, and 78a, 78b and the aperture member 90 is Z, the difference between dimensions of the openings of the apertures 92, 96, 96 at the opposite surfaces of the aperture member 90 is ΔX, and the angle of incidence of a light beam on the adjacent apertures 92, 94, 96 is α, of the following equations are established:

$$\Delta X = t \times \tan\theta \quad (1)$$

$$\tan\alpha = \frac{L}{Z} \quad (2)$$

where $\theta$ is the angle of inclination of inner wall surfaces 106 of the apertures 92, 94, 96. By defining the angle $\theta$ as follows:

$$2\theta + \alpha > \pi/2 \quad (3)$$

the angle $\theta$ can be determined from the above equations (1) and (2) (i.e., based on the parameters t, Z, and L).

When a light beam emitted from the LED 76a falls in the adjacent aperture 92 in FIG. 9, the light beam is reflected in a prescribed direction by the inner wall surface 106 of the aperture 92. By setting the various parameters so that the inequality (3) is established, the light beam emitted from the LED 76a is prevented from passing through the aperture 92 toward the focusing lens 61 and hence from adversely affecting an image produced on the photosensitive medium 14.

Figure 10:
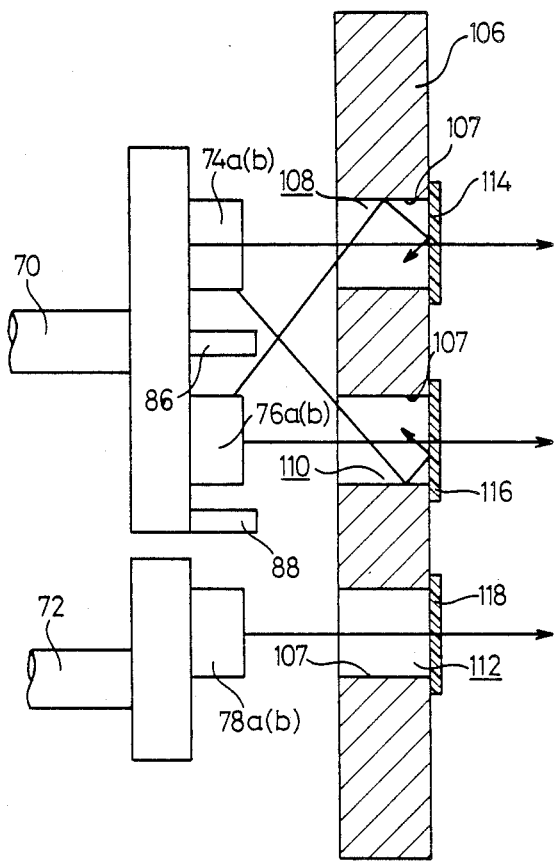
FIG. 10 is a fragmentary side elevational view, partly in cross section, of an exposure head according to a further embodiment of the present invention.

FIG. 10 illustrates an exposure head according to a further embodiment of the present invention for removing flaring light emitted from the LEDs 74a, 74b, 76a, 76b, and 78a, 78b. In FIG. 10, an aperture member 106 has apertures 108, 110, 112 defined therein and each having an inner wall surface 107 lying parallel to the optical axis of the focusing lens 61. Optical filters 114, 116, 118 are attached respectively over the openings of the apertures 108, 110, 112 which open toward the focusing lens 61, for selectively passing lights of predetermined wavelengths therethrough. The optical filter 114 passes only the light beam (having a wavelength of 805 nm, for example) emitted from the LEDs 74a, 74b, the optical filter 116 passes only the light beam (having a wavelength of 665 nm, for example) emitted from the LEDs 76a, 76b, and the optical filters 118 passes only the light beam (having a wavelength of 570 nm, for example) emitted from the LEDs 78a, 78b.

Flaring light emitted from the LED 76a and entering the adjacent aperture 108 is cut off by the optical filter 114 and does not reach the focusing lens 61. The light beam emitted from the LED 76a into the aperture 110 is passed through the optical filter 116 to the focusing lens 61. Therefore, the light beams emitted from the respective LEDs 74a, 74b, 76a, 76b, and 78a, 78b are only allowed to pass through the corresponding apertures 108, 110, 112 toward the focusing lens 61. As a consequence, the photosensitive medium 14 is irradiated with only the light beams which are modulated by desired image information but do not contain flaring light, so that an image of a very high quality can be formed on the photosensitive medium 14.

The optical filters 114, 116, 118 may be disposed respectively in the apertures 108, 110, 112 and held against the inner wall surfaces 107 thereof, or may be disposed over the openings of the apertures 108, 110, 112 which are closer to the LEDs 74a, 74b, 76a, 76b, and 78a, 78b.

The photosensitive medium 14 with an image thus formed on its exposed surface with a high degree of accuracy by the exposure head is then delivered to the water applicator 26 by rotating the photosensitive drum 20 in the direction of the arrow B. In the water applicator 26, water is applied as an image forming solvent to the exposed surface of the photosensitive medium 14. Then, the photosensitive medium 14 is sent to the thermal development and transfer unit 28. One image receptive medium 32 is delivered from the tray 30 by the supply roller 39 into overlapping relation to the photosensitive medium 14. In the thermal development and transfer unit 28, the photosensitive medium 14 is heated by the halogen lamp 38 to develop a colored image, which is then transferred onto the image receptive medium 32 between the heating drum 34 and the endless pressing belt 36. The image receptive medium 32 with the transferred colored image thereon is then separated from the photosensitive medium 14 by the peeling means 48, and thereafter dried by the drying means 53 and discharged onto the pickup tray 54. The photosensitive medium 14 is dried by the drying means 52 and then discharged into the waste tray 59.

Figure 11:
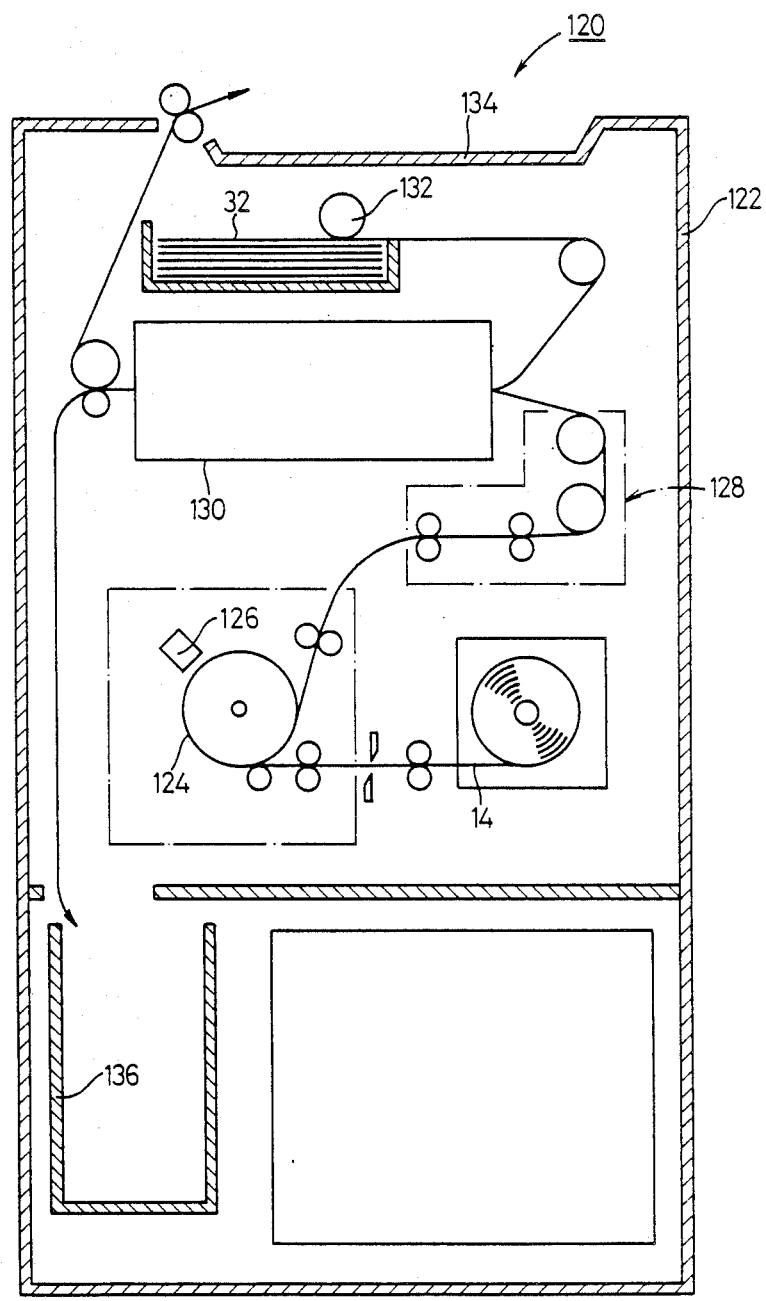
FIG. 11 is a schematic vertical cross-sectional view of another image recording apparatus employing an exposure head of the present invention.

The exposure head 22 described above can be employed not only in the image recording apparatus 10 shown in FIG. 1, but also in an image recording apparatus 120 illustrated in FIG. 11. In the image recording apparatus 120, a recording medium 14 loaded in a casing 122 is wound around a photosensitive drum 124, and thereafter image information is exposed to and recorded on the photosensitive medium 14 by an exposure head 126. Then, the photosensitive medium 14 is delivered via a water applicator 128 to a thermal development and transfer unit 130. An image receptive medium 32 loaded in the casing 122 is supplied by a supply roller 132 and overlapped on the photosensitive medium 14 in the thermal development and transfer unit 130. In the thermal development and transfer unit 130, the photosensitive medium 14 and the image receptive medium 32 which overlap each other are heated and fed linearly to transfer the image from the photosensitive medium 14 onto the image receptive medium 32. Then, the image receptive medium 32 is discharged onto a pickup tray 134 positioned in an upper portion of the casing 122, whereas the photosensitive medium 14 is delivered downwardly into a waste box 136 disposed in a lower portion of the casing 122. The image recording apparatus 120 can produce high-quality images by arranging the exposure head 126 as described above with respect to the aforesaid embodiments.

With the present invention, as described above, an image is formed by irradiating a photosensitive medium with light beams emitted from light-emitting devices of a light source and applied through apertures which are shorter in the main scanning direction and longer in the auxiliary scanning direction. Since the beam spot formed on the photosensitive medium by each of the light beams passing through the respective apertures is elongate in the auxiliary scanning direction, when the light beams are applied to scan the photosensitive medium at a high speed in the main scanning direction, the intensity of light to which the photosensitive medium is exposed has equal distributions in both the main and auxiliary scanning directions, with the result that a high-quality image free from irregularities can be produced on the photosensitive medium.

Furthermore, the light beams emitted from the respective light-emitting devices are applied to the photosensitive medium through the apertures which are smaller in size than the light-emitting areas of the light source. Therefore, the light beams can be directed to a desired position on the photosensitive medium irrespective of the positional accuracy of the light sources, so that a high-quality image free from irregularities can be produced on the photosensitive medium.

Moreover, light-shielding means are disposed between the light sources for cutting off flaring light produced by irregular reflection of the light beams emitted from the light sources, and hence a high-quality image which is not blurred can be formed on the photosensitive medium.

In addition, the apertures positioned between the light sources and the photosensitive medium are progressively tapered from the light sources toward the photosensitive medium. By suitably selecting the angle of inclination of an inner wall surface of each of the apertures, flaring light from the light sources can reliably be cut off without being applied to the photosensitive medium. As a consequence, a high-quality image which is not blurred can be formed on the photosensitive medium.

Although certain preferred embodiments have been shown and described, it should be understood that many changes and modifications may be made therein without departing from the scope of the appended claims.

What is claimed is:

1. An exposure head for scanning a photosensitive medium with light beams modulated by image information in a main scanning direction while the photosensitive medium and the light beams are being relatively moved in an auxiliary direction transverse to the main scanning direction, to record a two-dimensional image on the photosensitive medium, comprising:
    a light source for emitting the light beams; and
    an aperture member disposed between said light source and the photosensitive medium and having a plurality of apertures defined therein for passing the light beams respectively therethrough, each of said apertures being shorter in said main scanning direction and longer in said auxiliary scanning direction.

2. An exposure head according to claim 1, wherein said light source comprises a plurality of light-emitting devices, said apertures being positioned in alignment with said light-emitting devices respectively.

3. An exposure head for scanning a photosensitive medium with light beams modulated by image information to record an image on the photosensitive medium, comprising:
    a light source for emitting the light beams; and
    an aperture member disposed between said light source and the photosensitive medium and having a plurality of apertures defined therein for passing the light beams respectively therethrough, each of said apertures having a width smaller than that of a corresponding one of light-emitting areas of said light source.

4. An exposure head according to claim 3, wherein said light source comprises a plurality of light-emitting devices, said apertures being positioned in alignment with said light-emitting devices, respectively.

5. An exposure head for scanning a photosensitive medium with light beams modulated by image information to record an image on the photosensitive medium, comprising:
    a plurality of light sources for emitting the light beams, respectively; and
    a light-shielding member disposed between adjacent two of said light sources.

6. An exposure head according to claim 5, wherein said light-shielding member comprises a light-shielding plate.

7. An exposure head according to claim 5, wherein said light-shielding member comprises a light-emitting device which is incapable of emitting light.

8. An exposure head for scanning a photosensitive medium with light beams modulated by image information to record an image on the photosensitive medium, comprising:
    a plurality of light sources for emitting the light beams, respectively; and
    an aperture member disposed between said light sources and the photosensitive medium and having a plurality of apertures defined therein in alignment with said light sources, respectively, for passing the light beams respectively therethrough, each of said apertures being progressively tapered from one of the light sources toward said photosensitive medium.

9. An exposure head according to claim 8, wherein each of said apertures is defined by a wall surface inclined at an angle $\theta$ to the optical axis of the light beam passing therethrough, said angle $\theta$ being selected to meet the following relationship:

$$2\theta + \alpha > \pi/2$$

where $\alpha$ is the minimum angle at which the light beam emitted from an adjacent one of the light sources falls in said each aperture.

10. An exposure head for scanning a photosensitive medium with light beams modulated by image information to record an image on the photosensitive medium, comprising:
    a plurality of light sources for emitting the light beams, respectively;
    an aperture member disposed between said light sources and the photosensitive medium and having a plurality of apertures defined therein in alignment with said light sources, respectively, for passing the light beams respectively therethrough; and
    a plurality of optical filters positioned respectively over said apertures for selectively passing the light beams of respective wavelengths emitted from said light sources aligned respectively with said apertures.

* * * * *